June 5, 1962

C. W. MOSSBERG 3,037,264

COOLANT TYPE MILLING CUTTER (CONVERTIBLE SIDE AND END CUTTER)

Filed Sept. 8, 1959

INVENTOR.
Carl W. Mossberg.
BY
Wood, Herron & Evans.
ATTORNEYS.

United States Patent Office

3,037,264
Patented June 5, 1962

3,037,264
COOLANT TYPE MILLING CUTTER (CONVERTIBLE SIDE AND END CUTTER)
Carl W. Mossberg, 6514 Hamilton Ave., Apt. 1, Cincinnati 24, Ohio
Filed Sept. 8, 1959, Ser. No. 838,713
1 Claim. (Cl. 29—106)

This invention relates to a milling cutter adapted to be utilized either in an end or in a side milling operation and arranged to project jet streams of liquid coolant to the work and cutting edges during either operation.

One of the primary objectives of the present invention has been to provide a milling cutter of this type which is capable of machining hard metals and other materials which are difficult to machine and which cannot be worked efficiently with conventional milling cutters.

Briefly, the cutting tool of the present invention comprises a cylindrical tool body adapted to be mounted in the spindle of a machine tool, the tool body having helical flutes delineating side cutting edges, the lower ends of the flutes forming end cutting edges. During a side cutting operation, the periphery of the rotating tool is presented to the vertical side of a workpiece, whereby the side cutting edges act upon the side surface of the work. During an end cutting operation, the end of the tool is presented to the top surface of the work, such that the end cutting edges act upon the top surface.

According to the present invention, the tool body is provided with an axial coolant bore extending therethrough from the shank end of the tool to its cutting end. A series of restricted apertures extend outwardly from the axial bore to the helical flutes and are disposed at spaced planes along the tool axis. The area of the restricted apertures is but a fraction of the area of the axial bore and the axes are generally radial to the axial bore but are inclined at an angle toward the cutting end of the tool. During a side cutting operation, a removable plug is placed in the axial bore at the cutting end, and liquid coolant under pressure is supplied to the upper end of the axial bore to be projected in the form of jet streams from the restricted apertures to the side surface of the work in advance of the rotating cutting edges.

Each end cutting edge includes a relief angle in the form of a plane surface which is inclined upwardly from the cutting edge rearwardly in the direction of rotation. When the cutting end is presented to the surface of the work, these relief areas are converted into radial coolant passageways by the work surface. During an end cutting operation, the plug is removed from the cutting end, such that the coolant is projected from the lower end of the axial bore across the radial passageways and work surface in advance of the end cutting edges. Although the restricted radial apertures may be left open, they create sufficient flow resistance, due to their relatively small area, to insure an adequate supply of coolant to the cutting end. In addition, the flow streams which issue from the restricted apertures are directed downwardly to the top surface of the work in the area surrounding the cutting zone.

The present milling cutter, by virtue of the jet streams of coolant which are directed to the critical cutting zone, is capable of performing extremely difficult jobs at a rate which compares favorably with the production rates of conventional milling operations. The present tool is a companion to the coolant type drill disclosed in the prior patent of Carl W. Mossberg, No. 2,817,983, the drill being intended for drilling difficult materials while the present cutter is intended to be used in milling the same class of materials.

The various features and advantages of the present invention will be more clearly apparent to those skilled in the art from the following detailed description taken in conjunction with the drawings.

Figure 1:
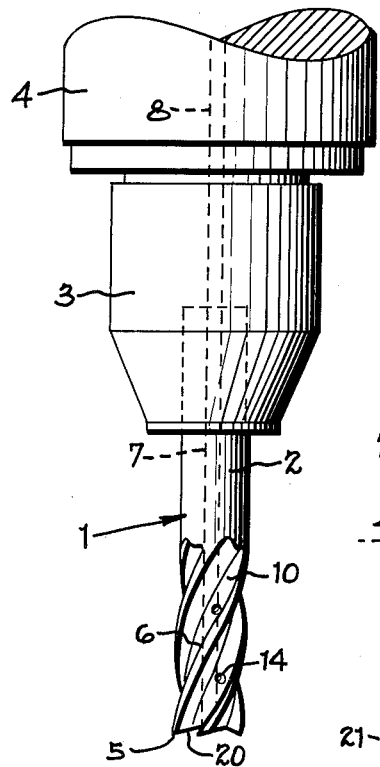
FIGURE 1 is a fragmentary side view showing the convertible milling cutter mounted in the spindle of a milling machine which is equipped to supply liquid coolant to the tool during a milling operation.

Described generally with reference to FIGURE 1, the milling cutter 1, which embodies the principles of the present invention comprises a cylindrical body, the upper portion of which forms a shank 2 adapted to be clamped in the chuck 3 of a tool spindle 4, for example, the spindle of a milling machine. During an end milling operation, the cutting end 5 of the rotating cutter is presented to the workpiece; during a side milling operation, the side cutting edges 6 are presented to the workpiece.

The present tool is intended for milling operations in general, and particularly, those involving materials which are difficult to machine. By way of example, in conventional milling machines, the spindle may be mounted for rotation about a horizontal axis above a reciprocating table upon which the workpiece is clamped. In an end milling operation, the spindle presents the cutting end 5 of the rotating cutter to the top surface of the advancing workpiece. In a side milling operation, the periphery of the tool is presented to the side portion of the workpiece, such that the side cutting edges 6 act upon the workpiece during the cutting strokes. The side cutting edges 6 may also be used in milling an irregular profile, such as a cam, utilizing a milling machine designed for this type of work.

In order to project the jet streams of coolant to the cutting end 5 or side cutting edges 6, the tool body is provided with an axial coolant bore 7 which extends completely through the tool to the cutting end. The spindle 4 and chuck 3 are also provided with an axial coolant bore 8, the chuck being arranged to establish a fluid-tight clamping engagement with the shank 2. In this type of machine tool, coolant is supplied under pressure to the bore 8 of the rotating spindle and forced through the bore 7 of the cutting tool to be projected upon the work surface in advance of the cutting edges of the tool.

It will be understood that the present coolant type milling cutter is particularly intended for milling materials which, because of extreme hardness or other factors, are difficult to mill and which cause rapid wear or destruction of conventional milling cutters. According to the present invention, the jet streams of liquid coolant, which are projected directly upon the surface of the work in advance of the cutting edges, carry away the chips as they are cut from the work, lubricate the cutting edges, and also dissipate the heat which is generated through the cutting action. As a result, the present tool is capable of machining materials which cannot, as a practical matter, be worked with conventional tools.

Figure 4:
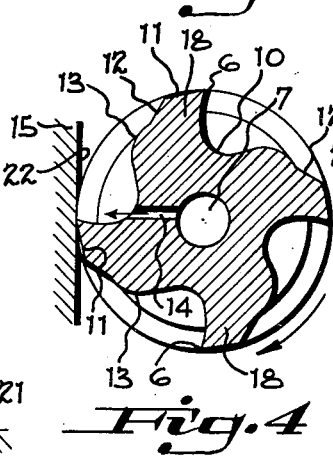
FIGURE 4 is a cross sectional view taken along line 4—4 of FIGURE 3, further detailing the side milling operation.

Described in detail (FIGURE 2), the working portion of the tool is delineated by a plurality of helical flutes 10 which extend from the cutting end 5 upwardly to the cylindrical shank 2, in the present instance the flutes being four in number. As viewed in FIGURES 4 and 5, each flute 10 is generally concave in cross section and the trailing edge of the flute, in the direction of rotation as indicated by the arrow, delineates a side cutting edge 6. Immediately behind the cutting edge 6, the periphery of the tool is machined to provide a relief angle 11 which provides clearance between the periphery of the tool and surface of the work. The relief angle 11 leads to an inwardly inclined clearance angle 12 which blends into a convex rib profile 13 leading to the concave flute 10.

Figure 2:
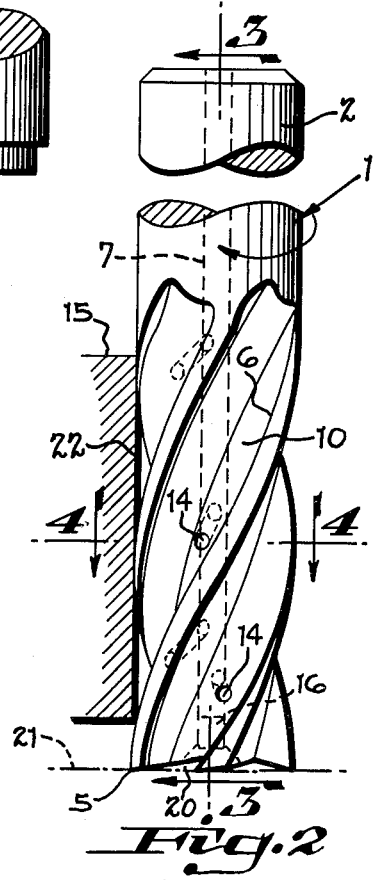
FIGURE 2 is an enlarged side view, showing the use of the tool in a side milling operation.
Figure 3:
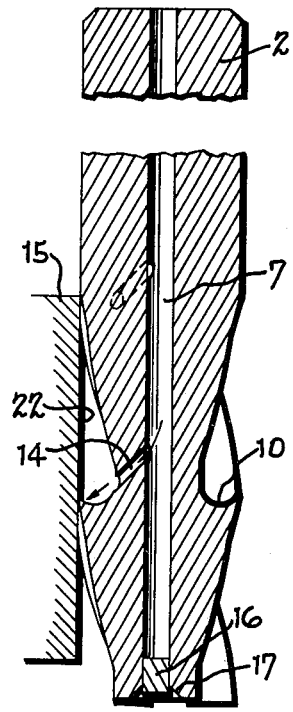
FIGURE 3 is a sectional view taken along line 3—3 of FIGURE 2, showing the projection of coolant radially toward the side cutting edges during the side milling operation.

As viewed in FIGURE 2, the flutes 10 and side cutting edges 6 create a helical rake, that is, the flutes and their cutting edges are angular to the longitudinal axis of the tool, such that the cutting edges 6 provide a progressive slicing action as the tool rotates. The helical disposition of the cutting edges brings about a smoother cutting action since more than one cutting edge is always acting upon the surface of the work during tool rotation.

To project the streams of liquid coolant to the work surface and cutting edges 6 during the side milling operation, there is provided a plurality of restricted apertures 14 extending radially from the axial coolant bore 7 and opening into the helical flutes. In the present example (FIGURE 2) each helical flute is provided with an individual aperture 14, the several apertures 14 being located in different planes along the length of the helical flutes so as to project the jet streams of coolant across the entire extent of the workpiece 15 during a side milling operation. It will be noted in FIGURE 4 that the area of each restricted aperture 14 is a small fraction of the area of the axial bore 7. As viewed in FIGURE 4, the apertures 14 are generally radial to the axis of the bore 6 so as to project the jet stream against the work surface in advance of the cutting edge, as indicated by the arrow.

During the side milling operation, the lower end of the axial coolant bore 7 is blocked off by a plug 16. This plug preferably is formed of a metal and establishes a light drive fit with bore 7. In order to convert the tool to an end cutting operation, plug 16 is removed. This may be accomplished by inserting a steel rod into the bore 7 from its upper end so that the plug may be dislodged by driving the rod downwardly. To facilitate insertion of the plug 16, the lower end of bore 7 is tapered as at 17.

Figure 5:
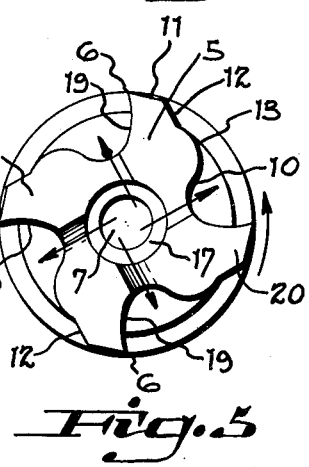
FIGURE 5 is an end view looking toward the cutting end of the tool and illustrating the cutting edges for end milling operations.

As viewed in FIGURE 5, the cutting end of the tool is in the form of four generally radial ribs indicated at 18, which are delineated by the concave helical flutes 10. The leading edge of each rib 18 delineates a generally radial cutting edge 19 having an outer end which joins the lower end of the helical side cutting edge 6. In order to provide working clearance, the end of each rib 18 is machined to provide an end clearance angle 20 (FIGURE 2) comprising a flat surface which slopes rearwardly, in the direction of tool rotation from the cutting edge 19. As viewed in FIGURE 2, the sloping flats 20 and cutting edges 19 delineate a stepped profile which forms radial coolant passageways when the cutting end 5 is presented to the surface of the work as indicated at 21 by the broken line.

Figure 6:
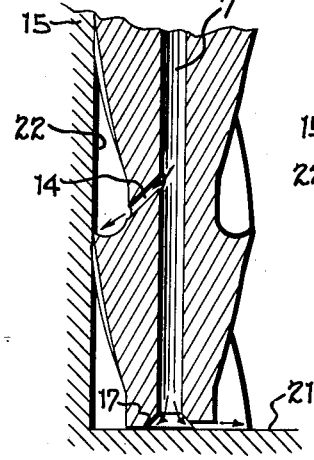
FIGURE 6 is a longitudinal sectional view similar to FIGURE 3, showing the tool operated as an end milling cutter, with the plug removed from the axial coolant bore for supplying coolant directly to the end cutting edges.

During the end milling operation (FIGURE 6) the cutting end 5 is presented to the horizontal surface 21 of the work with the plug 16 removed to permit the coolant to be projected from the end of bore 7 and across the surface of the work through the coolant passageways delineated by the sloping flats 20, as indicated by the arrows in FIGURES 5 and 6. Although the restricted passageways 14 may be left open during the end milling operation, the flow resistance of these apertures in relation to the radial end passageways allows an adequate supply of coolant to discharge across passageways.

As the coolant flows from the end of the bore 7 and radially across the surface of the work, it cools and lubricates the work and flushes the cuttings outwardly as they are formed along the cutting edges 19. Since the restricted apertures 14 are inclined downwardly, they also project coolant upon the work surface in the cutting area surrounding the tool so as to increase the efficiency of the operation.

It will be understood that the tool may also be employed in a combined end and side cutting operation, as in milling along the juncture of a horizontal and vertical surface. In the example shown in FIGURE 6, the tool may be fed along the vertical surface 22 so as to machine this surface while the cutting end 5 machines the horizontal surface 21. In this type of operation, the restricted apertures project the coolant to the vertical work surface while the axial bore projects the coolant to the horizontal surface.

Having described my invention, I claim:

A coolant supplying end milling cutter, said milling cutter having an axis of rotation and means for supplying liquid coolant to cutting edges thereon, said milling cutter comprising an elongated tool body having a cutting end and having a plurality of concave helical flutes extending upwardly from said cutting end, each of said flutes having a side cutting edge formed along the trailing edge thereof in the direction of the rotation of the tool body, each of said flutes terminating in an end cutting edge at the cutting end of the tool body, said end cutting edges being disposed in a plane at right angles to the axis of the tool body and extending along lines generally radial to the axis of the tool body, said cutting end having clearance flats which slope upwardly and rearwardly from said end cutting edges in the direction of the tool rotation, said tool body having an axial coolant bore extending therethrough to said cutting end, said clearance flats communicating with the end of said axial bore whereby said clearance flats are adapted to cooperate with said end cutting edges and a workpiece surface upon which said end cutting edges are cutting to define a plurality of restricted end flow passages from said axial bore, each of said end flow passages being a fraction of the area of the axial coolant bore, said tool body having radial apertures extending outwardly from said axial coolant bore, said radial apertures being located within said helical flutes with at least one aperture located within each of said plurality of flutes, the area of said apertures being a fraction of the area of the axial coolant bore, said apertures being disposed along axes which are inclined downwardly relative to the axial coolant bore toward said side cutting edges, whereby said end flow passages supply coolant to completely surround said end cutting edges when the said cutting end is presented to the surface of a workpiece and coolant is supplied through said axial bore, and said radial apertures being aligned to project jet streams of coolant against the surface of a workpiece in advance of said side cutting edges.

References Cited in the file of this patent

UNITED STATES PATENTS

| | | |
|---|---|---|
| 582,081 | Newton | May 8, 1897 |
| 960,526 | Erlardsen | June 7, 1910 |
| 1,746,716 | Sasse | Feb. 11, 1930 |
| 2,014,679 | Eckroate | Sept. 17, 1935 |
| 2,129,418 | Gase | Sept. 6, 1938 |
| 2,237,901 | Chun | Apr. 8, 1941 |
| 2,377,329 | Dettmer | June 5, 1945 |
| 2,411,209 | Hall | Nov. 19, 1946 |
| 2,528,300 | Degner | Oct. 31, 1950 |
| 2,554,783 | Lee | May 29, 1951 |
| 2,815,688 | Forbes | Dec. 10, 1957 |
| 2,817,983 | Mossberg | Dec. 31, 1957 |
| 2,847,885 | Wagner | Aug. 19, 1958 |
| 2,942,501 | Kallio | June 28, 1960 |